United States Patent [19]

Covey, Jr.

[11] Patent Number: 4,483,695

[45] Date of Patent: Nov. 20, 1984

[54] APPARATUS FOR VIBRATION SEPARATION OF OIL AND WATER

[76] Inventor: Walter R. Covey, Jr., Rte. 10, Box 524, Ashe Rd., Bakersfield, Calif. 93309

[21] Appl. No.: 595,962

[22] Filed: Apr. 2, 1984

[51] Int. Cl.³ .................... B01D 19/00; C02F 1/34; C02F 1/40

[52] U.S. Cl. .................... 55/159; 210/708; 210/748; 210/750; 210/188; 210/219; 210/537; 210/539; 210/540; 210/541; 366/123; 366/124; 55/172

[58] Field of Search .......... 55/159, 172-177, 55/52; 210/708, 748, 750, 188, 219, 537, 538, 539, 540, 541; 366/123, 124, 125, 126

[56] References Cited

U.S. PATENT DOCUMENTS

| | | | |
|---|---|---|---|
| 2,376,221 | 5/1945 | Baker | 55/159 |
| 2,597,505 | 5/1952 | Lindkvist | 366/123 |
| 2,967,048 | 1/1961 | Fontaine | 366/123 |
| 3,020,720 | 2/1962 | Spalding | 366/124 |
| 3,432,426 | 3/1969 | Megel | 210/748 |
| 3,814,385 | 6/1974 | Holmlund | 366/126 |
| 4,153,375 | 5/1979 | Hillyar-Ross | 210/748 |
| 4,199,264 | 4/1980 | Uebel | 366/123 |
| 4,326,859 | 4/1982 | Burnham | 55/159 |
| 4,428,678 | 1/1984 | Lyle | 366/124 |
| 4,428,757 | 1/1984 | Hall | 210/748 |

FOREIGN PATENT DOCUMENTS

| | | | |
|---|---|---|---|
| 886683 | 11/1971 | Canada | 210/748 |
| 2117662 | 10/1983 | United Kingdom | 55/159 |

Primary Examiner—Ernest G. Therkorn
Attorney, Agent, or Firm—Harvey B. Jacobson

[57] ABSTRACT

An elongated casing is provided and is closed at one end. A fluid pressure actuated elongated internal vibrator of the type including an internal fluid pressure driven eccentric weight orbital about an axis extending centrally longitudinally through the vibrator is provided and is loosely telescoped into the other end of the casing. The other casing end is tightly closed about the adjacent end of the internal vibrator and the interior of the casing is filled with a hard fluent aggregate disposed about the vibrator and a pair of annular members are tightly mounted upon and extend about longitudinally spaced portions of the vibrator and include outer peripheral portions spaced inward of the inner surfaces of the casing. The vibrator and its surrounding aggregate filled casing may be suspended in a tank containing well effluent of the type comprising water and oil and having gas suspended therein. The vibrator produces generally 12,000 VPM and is highly effective in stratifying oil and water within the tank and also driving off the gas therefrom.

9 Claims, 6 Drawing Figures

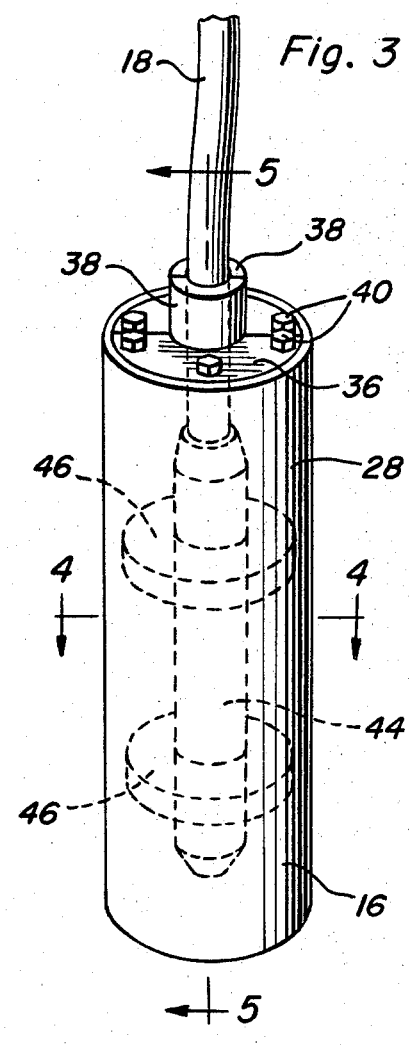
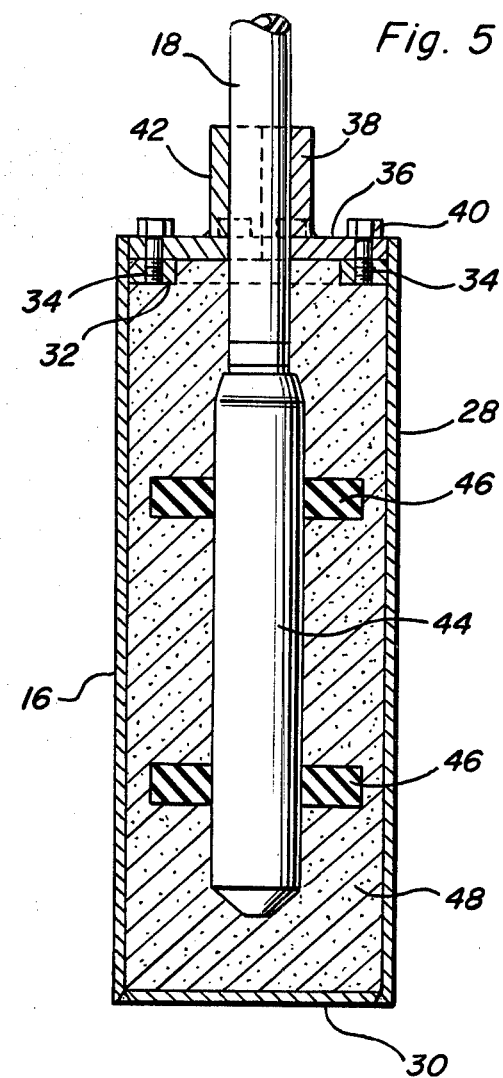
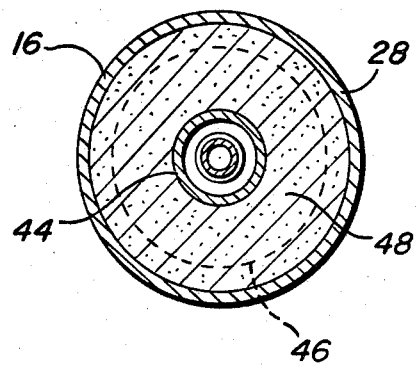
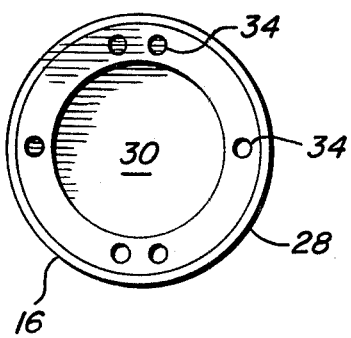

APPARATUS FOR VIBRATION SEPARATION OF OIL AND WATER

BACKGROUND OF THE INVENTION

When crude oil is received from the wellhead it is mixed with water and the oil and water combination is discharged into a receiving tank for several days. The heavy crude, which is a combination of water and crude oil, passes into what is termed a wash tank. In the wash tank the crude is heated for approximately ten days. During this time various chemicals are added to facilitate the precipitation of the water from the crude in order to reduce the content of water in the crude from approximately 40° to approximately 1°. Thereafter, the crude is shipped to the refineries.

The heating and chemical treatment of crude over this relatively long period is expensive not only from a standpoint of man hours but also from a standpoint of equipment, heat energy and chemicals. Accordingly, a need exists whereby the water in heavy crude may be more quickly, efficiently and inexpensively precipitated therefrom.

Various different forms of liquid separating devices including some of the general structural and operational features of the instant invention are disclosed in U.S. Pat. Nos. 2,257,997, 2,420,687, 3,432,426, 3,970,564 and 4,039,456. However, these separating devices have not been specifically designed to accomplish the separating function of the instant invention and in the manner disclosed hereinafter.

BRIEF DESCRIPTION OF THE INVENTION

The apparatus and method of the instant invention comprises and utilizes, respectively, a conventional pneumatic internal vibrator such as that manufactured by Wacker Corporation, Milwaukee, Wis. These vibrators are designed primarily for use in building construction, and specificaly for use in compaction of concrete in foundations, slab work, footings, walls, columns and also for use in concrete compaction in highway and bridge constructions. However, these internal vibrators, by themselves, have been found not to be effective in separating crude oil mixture components contained in large tanks.

Accordingly, these internal vibrators must be modified in order to provide an effective apparatus for separating oil mixture components contained in large tanks and it is the structure by which these internal vibrators are modified that enables their use as an apparatus for separating oil mixture components.

The internal vibrator includes an elongated cylindrical vibrator head incorporating an internal fluid pressure driven eccentric which orbits about the longitudinal central axis of the head and generates approximately 12,000 VPM. The vibrator is telescoped within one end of an otherwise closed cylindrical casing with an annular space being defined between the outer surfaces of the vibrator head and the inner surfaces of the casing. This annular space is occupied in part by annular spacing members carried by the vibrator head at points spaced therealong and also by a hard aggregate such as sand. By surrounding the vibrator head with aggregate within the casing considerable weight is added to the head with the result that the internal vibrator head is rendered capable of efficiently separating oil mixture components when the head and the surrounding casing is suspended within a relatively large volume of water and gas containing well crude.

The main object of this invention is to provide an apparatus which may be readily utilized to separate oil mixture components contained within a large volume tank.

Another object of this invention is to provide an apparatus for separating oil mixture components and which is operative completely independent of nearby electricity consuming power units and any form of electrical treatment.

Still another important object of this invention is to provide an improved method of separating crude oil mixture components.

A further object of this invention is to provide an oil mixture component separating apparatus and method which may be practiced on a small production scale as well as a large production scale.

A final object of this invention to be specifically enumerated herein is to provide a method and apparatus of separating oil mixture components and which will conform to conventional forms of manufacture, be of simple construction and easy to use so as to provide a device and method, be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a perspective view of the suspension type of vibrator of the instant invention;

FIG. 4 is an enlarged horizontal sectional view taken substantially upon the plane indicated by the section line 4—4 of FIG. 3;

FIG. 5 is an enlarged vertical sectional view taken substantially upon the plane indicated by the section line 5—5 of FIG. 3; and FIG. 6 is a top plan view of the casing portion of the vibrator with the segmental upper end wall thereof removed.

DETAILED DESCRIPTION OF THE INVENTION

Figure 1:
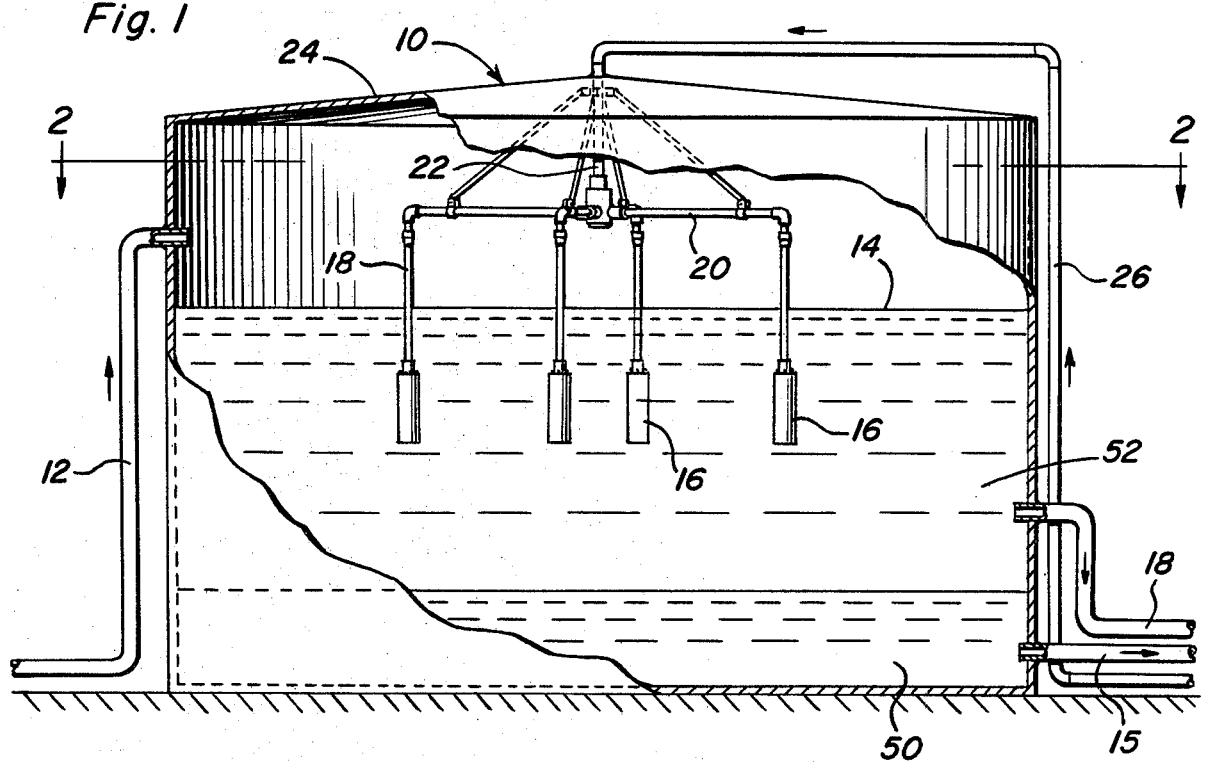
FIG. 1 is a side elevational view of a large volume settling tank with which the apparatus of the instant invention is operatively associated, portions of the settling tank being broken away and illustrated in vertical section.
Figure 2:
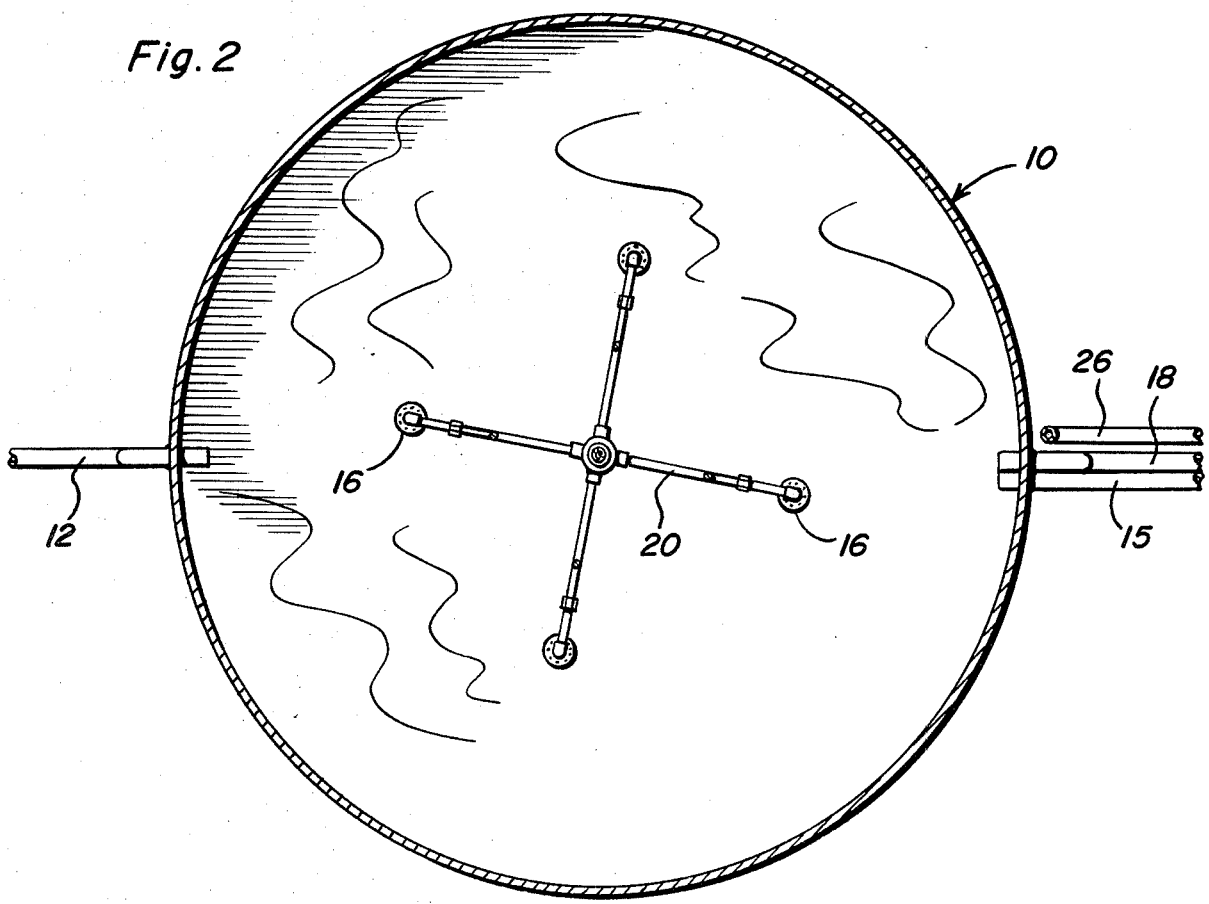
FIG. 2 is a horizontal sectional view taken substantially upon the plane indicated by the section line 2—2 of FIG. 1.

Referring now more specifically to the drawings the numeral 10 generally designates a settling tank into which well crude is pumped through a delivery pipe 2. The level of crude within the tank 10 is maintained generally constant at the level 14 and the tank 10 includes a water discharge pipe 15 and an oil discharge pipe 18. In addition, the tank 10 may also include a gas outlet (not shown) which may open outwardly of the tank 10 above the level 14.

The vibration apparatus of the instant invention includes a plurality of vibrators 16 which are suspended within the tank 10 below the level 14. Each of the vibrators 16 is pneumatically actuated and is suspended by an air supply line 18 from a manifold assembly 20 supported and suspended from a main airline outlet end 22 which projects down into the interior of the tank 10 through the top wall 24 thereof. The outlet end 22 comprises the discharge end of a high volume and high pressure delivery airline 26.

With attention now invited more specifically to FIGS. 3 through 6 of the drawings, it may be seen that each of the vibrators 16 includes an outer cylindrical casing 28 sealingly closed at one end by an end wall 30 and including an internal annular partial end wall 32 at its other (upper) end. The annular end wall includes peripherally spaced threaded bores 34 formed therethrough and a segmental outer end wall 36 comprising a pair of half end wall sections 38 is secured within the upper end of the casing 28 by fasteners 40 secured through outer peripheral portions of the end wall sections 38 and threadedly engaged in the bores 34. The end wall sections 38, together, define a tubular nipple which tightly embraces the discharge end of the corresponding air supply line 18. The air supply line 18 supplies air under pressure to an elongated cylindrical vibrator head 44 of the type including an air-driven eccentric orbital about a longitudina central axis of the head 44 and of the type manufactured by Wacker Corporation of Milwaukee, Wis. The head 44 has a pair of longitudinally spaced hard rubber abutments 46 disposed thereon at points spaced longitudinally there along and the abutments 46 include outer peripheral portions which are spaced inwardly of the opposing inner surfaces of the casing 28.

From FIG. 5 of the drawings it will be noted that a quantity of fill material 48 is disposed within the casing 28 exteriorly of the head 44. This fill material comprises a hard aggregate such as sand and serves, together with the casing 28, to add substantial weight to the vibrator head 44. This substantial weight, together with vibration of the head 44 at generally 12,000 VPM provides sufficient vibration to the crude oil mixture within the tank 10 to cause relatively rapid settling or precipitation of the water component 50 to the bottom of the tank, thereby leaving the oil component 52 of the mixture above the water component. The tank is designed to separate oil mixture components on a batch basis and the vibration of the vibrators 16 within the tank 10 also causes gaseous components of the crude oil mixture to be driven off and to be trapped within the tank 10 above the level 14. These gaseous components may be readily drawn off from the tank 10 through a suitable conduit (not shown) provided therefor.

Although the settling tank 10 comprises a large volume tank of approximately 2,000 barrel capacity and, accordingly, four vibrators 16 are suspended therein, it is to be noted that smaller volume settling tanks may also be used to practice the invention in conjunction with a lesser number of vibrators 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vibration apparatus for separating oil and water, said apparatus including a fluid pressure actuated elongated internal vibrator of the type including an internal eccentric weight orbited about an axis extending generally centrally longitudinally through said vibrator, an elongated casing, said vibrator being loosely received within said casing and extending centrally longitudinally thereof, said casing being substantially closed and including support means therein mounting said vibrator in position within said casing substantially against movement of said vibrator relative to said casing and in a vibration transfer manner whereby vibration of the vibrator will be transferred to said casing, said casing being adapted to be suspended for free vibration within a tank containing a mixture of oil and water for vibration separation of said oil and water and stratification of said oil and water in upper and lower portions of said tank.

2. The apparatus of claim 1 wherein said support means includes a hard fluent aggregate disposed within said casing about said vibrator and substantially filling the interior of said casing exteriorly of said vibrator.

3. The apparatus of claim 1 wherein said casing includes an open end and end wall means removably closing said open end, said vibrator and support means being removable through said open end when said end wall is removed.

4. The apparatus of claim 1 wherein said support means includes a hard fluent aggregate disposed within said casing about said vibrator and substantially filling the interior of said casing exteriorly of said vibrator, said hard fluent aggregate including sand.

5. The apparatus of claim 1 wherein said support means includes a hard fluent aggregate disposed within said casing about said vibrator and substantially filling the interior of said casing exteriorly of said vibrator, a pair of annular members tightly disposed about longitudinally spaced portions of said vibrator and including outer peripheral portions spaced inward of the inner surfaces of said casing.

6. The apparatus of claim 5 wherein said annular members are constructed of hard elastomeric material.

7. In combination with a settling tank including a quantity of crude oil therein consisting of a mixture of water and crude oil having gas suspended therein, said tank including low level water outlet means and oil outlet means disposed at a level above said low level, means operative to admit crude oil into said tank, vibration generating means freely suspended within said tank below the level of crude oil therein including a fluid pressure actuated elongated internal vibrator of the type including an internal eccentric weight orbited about an axis extending generally centrally longitudinally through said vibrator, and an elongated casing, said vibrator being loosely received within said casing and extending centrally longitudinally thereof, said casing being substantially closed and including support means therein mounting said vibrator in position within said casing substantially against movement of said vibrator relative to said casing and in a vibration transfer manner whereby vibration of the vibrator will be transferred to said casing.

8. The tank of claim 7 wherein said support means includes a hard fluent aggregate disposed within said casing about said vibrator and substantially filling the interior of said casing exteriorly of said vibrator.

9. The tank of claim 8 wherein said casing includes an open end and end wall means removably closing said open end, said vibrator and support means being removable through said open end when said end wall is removed.

* * * * *